United States Patent Office 2,983,734
Patented May 9, 1961

2,983,734

CATALYTIC HYDROGENATION

Donald E. Sargent, Ballston Lake, N.Y., assignor to General Electric Company, a corporation of New York No Drawing. Filed Dec. 13, 1955, Ser. No. 552,692

19 Claims. (Cl. 260—347.8)

This invention relates to the catalyst hydrogenation of certain types of organic compounds in the presence of selected reaction media. More particularly, this invention relates to the hydrogenation of the carbonyl groups of carbonyl-containing organic compounds to carbinol groups in the presence of a reaction medium comprising a monoalkyl ether of a compound selected from the class consisting of an alkylene glycol or a polyalkylene glycol and in the presence of a Raney-type nickel catalyst. This invention is also concerned with acid-activated Raney-type nickel catalysts and their use in the above reaction.

The term "carbonyl-containing organic compound" is intended to refer to any type of organic compound containing an aldehyde or ketone group as long as this organic compound is normally amenable to base metal (as distinguished from noble metal) catalyst hydrogenation. Thus, the term carbonyl-containing organic compound includes aldehydes such as acetaldehyde and its homologues, ketones such as acetone and its homologues, hydroxy carbonyl compounds such as glucose, heterocyclic compounds such as furfural, etc. The terms "hydrogenation" and "reducing" as used in the present application refer to the addition of hydrogen to a carbonyl group to convert that group into a carbinol group. This term is used regardless of whether any other hydrogen addition take place in addition to that which converts the carbonyl group to a carbinol group. Thus, the terms "hydrogenation" or "reducing" would include the hydrogenation of furfural to tetrahydrofurfuryl alcohol and the hydrogenation of glucose to sorbitol.

Heretofore, it has been known to reduce carbonyl-containing organic compounds to the corresponding carbinol compounds by chemical and electrolytic methods as well as by catalytic hydrogenation. However, these methods of reduction often involve the use of relatively expensive materials and present difficult separation problems. The catalytic methods of hydrogenating carbonyl compounds as known in the prior art has often been disadvantageous in that the rate of reaction has been extremely slow at low hydrogen pressures, while the use of higher hydrogen pressures to obtain satisfactory reaction rates requires expensive high pressure equipment and introduces safety hazards to operating personnel. In the prior art catalytic hydrogenations of carbonyl-containing organic compounds it has been common to conduct the hydrogenation in the vapor phase or to conduct the hydrogenation in the liquid phase either with or without solvents. When solvents have been employed, they have often been selected indiscriminately without regard for their effect on the efficiency of the reaction. This has generally resulted in the use of solvents which have required the use of hydrogen pressures in excess of 10 atmospheres and more often in the neighborhood of 100 atmospheres or higher.

An object of the present invention is to provide a method for the efficient catalytic hydrogenation of carbonyl-containing organic compounds at relatively low pressures.

A further object of the present invention is to provide a method for the hydrogenation of carbonyl-containing organic compounds to the corresponding carbinol compounds using selected solvents which eliminate the need for maintaining the reaction system under high pressures.

These and other objects of our invention are accomplished by contacting with hydrogen a mixture of a carbonyl-containing organic compound, a Raney-type nickel hydrogenation catalyst, and a solvent having the formula (1)     $R(OCR'_2CR'_2)_bOH$ where R is a member selected from the class consisting of alkyl radicals, e.g., methyl, ethyl, propyl, cyclohexyl, etc. radicals, R' is a member selected from the class consisting of hydrogen and alkyl radicals, e.g., methyl, ethyl, propyl, butyl, etc., radicals; and $b$ is a whole number from 1 to 3, inclusive.

Among the monoalkyl ethers of alkylene or polyalkylene glycols (hereinafter referred to as "hydroxy ethers") within the scope of the present invention are included, for example, the monomethyl ether of ethylene glycol, the monomethyl ether of diethylene glycol, the monoethyl ether of triethylene glycol, the monoethyl ether of propylene glycol, the monoethyl ether of diethylene glycol, the monoethyl ether of dipropylene glycol, the monobutyl ether of triethylene glycol, etc.

I have found that the catalysts employed in the practice of the present invention are critical and limited to Raney-type nickel catalysts. When other types of commonly known hydrogenation catalysts are employed, the hydrogenation reaction does not proceed satisfactorily at the relatively low pressures employed in the present invention. Raney nickel is a well known hydrogenation catalyst and descriptions of this catalyst may be found in U.S. Patent 1,628,190, Raney, and in J.A.C.S. 54, 4116 (1932). In general, this catalyst is prepared from an alloy made up of about 50 percent aluminum and about 50 percent nickel. The finely powdered alloy is treated with a 20 percent solution of sodium or potassium hydroxide until the alkali dissolves most of the aluminum in the alloy leaving the nickel in a finely divided, porous and highly active form. The nickel is then washed several times with water and thereafter stored under water or one of the monoalkyl ethers of a monoalkylene glycol or polyalkylene glycol employed in the practice of the present invention until the catalyst is to be used. As is well known, this catalyst is relatively inexpensive on the basis of the amount of product produced, which offers an additional advantage to the process of the present invention. The term "Raney-type nickel" referred to in the present application is intended to mean skeletal alloy catalysts which have been prepared by leaching the aluminum from an alloy comprising principally nickel and aluminum and, of course, includes the catalyst described in the aforementioned Raney patent.

In addition, the term describes catalysts which have been modified with minor amounts of one or more metals in addition to the aluminum and nickel, such as the catalyst described in Patent 2,502,348, Scriabine et al., which is a skeletal alloy catalyst prepared by leaching the aluminum out of an alloy containing substantially equal parts by weight of nickel and aluminum and from 0.5 to 3.5 percent by weight of chromium based on the nickel content. Additional Raney-type nickel catalysts are those prepared by leaching the aluminum from ternary alloys of aluminum, nickel and a member selected from the class consisting a molybdenum, titanium, zirconium, vanadium, cerium, manganese, etc. These ternary alloy catalysts containing molybdenum, titanium or zirconium are not my invention but are the invention of Robert L. Hadley. The molybdenum-containing catalysts are described and claimed in his application Serial No. 552,708, now U.S. Patent 2,948,687, issued August 9, 1960. The titanium and zirconium-containing catalysts are described and claimed in his application Serial No. 552,723, now abandoned. These applications are filed concurrently herewith and assigned to the same assignee as the present invention. In general, where a third metal is added to the aluminum-nickel alloy, this third metal is present in an amount from about 0.5 to 5 percent by weight based on the weight of the nickel.

Raney-type nickel catalysts also include Raney nickel or modified Raney nickel which has been copper-plated. This copper-plated Raney nickel or modified Raney nickel is described in detail in my copending application Serial No. 552,726, now U.S. Patent No. 2,892,801, issued June 30, 1959, filed concurrently herewith and assigned to the same assignee as the present invention. This material may be prepared by treating Raney nickel or modified Raney nickel with an aqueous solution of a copper salt such as copper sulfate, copper acetate, copper chloride, etc. The result of this treatment is the substitution of copper for a portion of the nickel in the catalyst to form a copper-plated catalyst.

The term "Raney-type nickel catalyst" also includes phosphoric acid activated Raney nickel or sulfuric acid activated Raney nickel. These phosphoric or sulfuric acid activated Raney-type nickels may be prepared by washing the Raney-type nickel with an aqueous phosphoric or sulfuric acid solution prior to incorporation of the catalyst into the hydrogenation system. Alternatively, the acid may be added to the hydrogenation system as a solution in a hydroxy ether.

Although the exact mechanism involved in the treatment of the catalyst with phosphoric or sulfuric acid is not known, it is believed that the acid is absorbed by the catalyst or reacts with the catalyst in some manner.

Where phosphoric acid activated Raney-type nickel is employed, I prefer to have the phosphoric acid present in an amount equal to from 0.001 to 0.03 part by weight of phosphoric acid per part of the Raney-type catalyst. As previously mentioned, the phosphoric acid may be added to the catalyst in the reaction mixture or prior to the incorporation of the catalyst into the reaction mixture. Where the phosphoric acid is added to the catalyst in the reaction mixture, I prefer to add the acid as a solution in the hydroxy ether. Thus, I generally add a concentrated aqueous phosphoric acid solution, such as, for example, an 85 percent by weight aqueous phosphoric acid solution to a relatively large amount of the hydroxy ether which is to be employed in the reaction and add the resulting solution to the reaction mixture along with the carbonyl-containing organic compound which is to be hydrogenated and the Raney-type nickel catalyst. One suitable solution which I have employed for adding the phosphoric acid to the reaction mixture is the solution prepared by adding 1 ml. of 85 percent phosphoric acid to 99 ml. of the monomethyl ether of ethylene glycol.

Where the Raney-type nickel catalyst is to be activated with phosphoric acid prior to incorporation of the catalyst into the reaction mixture, the catalyst is treated with an aqueous phosphoric acid solution until the desired amount of phosphoric acid has been absorbed upon the surface of the catalyst. The aqueous solutions employed in pretreating the catalyst prior to its incorporation into the reaction mixture may be an aqueous solution of any concentration, for example, a concentration of from 0.1 percent by weight to 10 percent by weight of phosphoric acid.

These phosphoric acid treated Raney-type nickel catalysts are superior to catalysts which have not been acid treated in that the reaction rate observed with the treated catalysts is superior to the reaction rate observed in untreated catalysts.

As is the case with the phosphoric acid treatment of Raney nickel, the sulfuric acid treatment of Raney-type nickel catalysts may also be accomplished by either pretreating the catalyst with aqueous sulfuric acid prior to incorporation of the catalyst into the reaction mixture or by adding the sulfuric acid as an aqueous solution to the reaction mixture and subsequently adding the Raney-type nickel catalyst. The range of concentrations of the sulfuric acid used as a catalyst activator is the same as that described in connection with the phosphoric acid. Thus, on a weight basis, I employ from 0.001 to 0.03 part of sulfuric acid per part of Raney-type nickel catalyst regardless of whether the sulfuric acid is employed in the reaction mixture or whether the acid is used to pretreat the catalyst.

Among the carbonyl-containing organic compounds which can be employed in the practice of the present invention may be mentioned simple aldehydes such as aliphatic aldehydes, for example, acetaldehyde, propionaldehyde, butyraldehyde, n-valeraldehyde, heptaldehyde, etc., n-stearaldehyde, benzaldehye, acrolein, furfural, crotonaldehyde, aldol, glyoxal, etc. Among the more common aliphatic ketones within the scope of the present invention are included, for example, acetone, diethyl ketone, methylethyl ketone, diisoamyl ketone, methylisobutyl ketone, methyl n-nonyl ketone, acetoacetic acid esters, mesityl oxide, diacetyl, acetonyl acetone, jasmone, cyclopentadecanone, civetone, muskone. Also within the scope of the present invention are the compounds commonly referred to as carbohydrates, such as the monosaccharides and the polysaccharides of both the aldose and ketose types. Examples of these carbohydrates include, for example, aldobiose, aldotrioses, aldotetroses, ketotriose, ribose, arabinose, lyxose, xylose, allose, altrose, mannose, talose, glucose, gulose, idose, galactose, ribulose, fructose, sorbose, sucrose, levulose, maltose, lactose, cellobiose, gentiobiose, melibose, etc., and the solvate of these carbohydrates, such as the hydrates. In the case of the non-reducing polysaccharides such as sucrose, the reduction of the present invention is applicable to the hydrolysis product.

In evaluating and comparing various hydrogenation systems, it is necessary to establish a "rate constant" for each system. I have found that the reaction which comprises the hydrogenation of the carbonyl groups of carbonyl-containing organic compounds to carbinol groups is a pseudo-first order reaction and, therefore, at a given hydrogen pressure and a given temperature, the rate of reaction is directly proportional to the concentration of the material being hydrogenated. In equation form this is $$(2) \qquad -\frac{dC}{dt} = kC$$

where C is the concentration of the material being hydrogenated, $t$ is time and $k$ is a constant. Upon integration of Equation 2 from time 0 to time $t$, it is found that the logarithm of the initial concentration over the concentration at time $t$ is proportional to the time of reaction as expressed by the following equation:

$$(3) \qquad \log \frac{C_o}{C_t} \sim Kt$$

where $C_t$ is the concentration of the material being hydrogenated at time $t$, $C_0$ is the initial concentration of the material being hydrogenated, and K is a proportionality constant.

In the following the hydrogenation reactions described in the present invention, the change in concentration of the material being hydrogenated with time was followed by measuring the amount of hydrogen used in the reaction as a function of time. The logarithm of the initial concentration of material being hydrogenated divided by the concentration of the material remaining at time $t$ was plotted against time and for convenience one thousand times the slope of the resulting straight line was taken as the "rate constant" in the present application.

The hydrogenation reaction of the present invention is carried out in a conventional manner by maintaining hydrogen at a suitable pressure in contact with an agitated mixture of the carbonyl-containing organic compound, the hydroxy ether, and the Raney-type catalyst. The hydrogenation is accomplished in a vessel capable of withstanding the reaction pressures and temperatures and which is surrounded by a suitable heating jacket and is connected to a hydrogen supply tank. As usually obtained commercially, Raney-type nickel is stored under water. Since the reaction of the present invention is carried out in the substantial absence of water, the Raney-type nickel is washed a plurality of times with the hydroxy ether until it replaces all of the water. After the addition of the catalyst, the carbonyl-containing organic compound, and the hydroxy ether to the reaction vessel, the vessel is evacuated or purged several times with hydrogen to remove all air. After connection with a suitable source of hydrogen, the reaction vessel is heated to the temperature at which the reaction is to be effected and the contents are agitated during the course of the reaction. The progress of the reaction is observed by observing the amount of hydrogen consumed.

The pressures and temperatures employed in the process of the present invention may vary within wide limits. Because of the high reaction rate constant found in the hydrogenation system of the present invention, the reaction may be carried out at room temperature (i.e. a temperature of about 25° C.) and atmospheric pressure. However, I generally employ temperatures of from about 50–160° C. and preferably from about 100–150° C. to obtain the optimum rate of hydrogenation of the carbonyl-containing organic compounds. This upper temperature limit is, of course, somewhat dependent on the temperature at which the carbonyl-containing organic compound decomposes at an appreciable rate. The pressure employed in the practice of the present invention is not critical and may vary from atmospheric pressure or lower to any pressure which the reaction equipment will withstand. However, in order to permit the use of relatively conventional and inexpensive reaction equipment, I prefer to employ pressures in the range of from about atmospheric up to about 150 pounds per square inch gauge (p.s.i.g.). A preferred specific pressure range is from about 30 to 70 p.s.i.g. At these pressures, the rate of conversion of the carbonyl-containing organic compound is quite satisfactory for economical operation.

After the hydrogenation reaction has been completed, the hydrogenation catalyst may be "regenerated" if desired by maintaining the reaction mixture at the reaction temperature and pressure for a period which varies from about 15 minutes to 3 hours.

In the absence of such regeneration, it has been found that the rate constant of the hydrogenation system when reusing certain Raney-type catalysts begins to fall off at a slow rate. However, when the catalyst is regenerated as previously described, it has been found that the activity of the catalyst (and the rate constant) are maintained at a steady value for an indefinite number of runs. This method of catalyst regeneration is more completely described and claimed in the copending application of Donald E. Sargent and John R. Elliott, Serial No. 552,727, filed concurrently herewith and assigned to the same assignee as the present invention, now abandoned.

After the hydrogenation reaction is completed, including regeneration of the catalyst if regeneration is used, the catalyst is separated from the reaction mixture by filtration, and the product is separated from the hydroxy ether and from any unreacted carbonyl-containing compound by fractional distillation, steam distillation, crystallization or the like.

Although the relative amounts of carbonyl-containing compound, Raney-type catalyst and hydroxy ether in the reaction mixture may vary within wide limits, I have found that for a given system there is generally some optimum relationship of the concentration of the three ingredients. Generally, I employ from about 0.5 to 5 parts and preferably three parts by weight of the hydroxy ether per part of the carbonyl-containing organic compounds. As is the case with most catalytic reactions, the rate of reaction is dependent to a large extent on the concentration of the catalyst. Thus, as the amount of catalyst employed in the reaction increases, the time required to hydrogenate a given amount of the carbonyl-containing compound decreases. I have found that the catalyst concentration may vary within wide ranges depending on the reaction time desired. Thus, I am able to employ from about 0.01 to 1 part by weight of the Raney-type catalyst per part of carbonyl-containing compound. However, I prefer to employ from about 0.05 to 0.1 part by weight of the catalyst per part of carbonyl-containing compound.

The following examples are illustrative of the practice of my invention and are not for purposes of limitation.

Except as indicated otherwise in the examples, the hydrogen pressure was always 50 p.s.i.g. and the temperature of the reaction mixture was 125° C. In all of the examples, the reaction mixture was placed in a vessel comprising a Parr low pressure hydrogenator which had standard agitation and which was then flushed with hydrogen to remove traces of moisture. The hydrogenator was then connected to the hydrogen supply tank and the reaction mixture was heated to the reaction temperature and the reaction was allowed to proceed, and the hydrogen consumption was noted during the course of the reaction. Standard agitation conditions were employed in all of the examples to eliminate the effect of a varying rate of agitation on the rate constants.

*Example 1*

About 3 grams of commercial Raney nickel was washed several times in the monomethyl ether of ethylene glycol. The washed Raney nickel was then added to a reaction mixture consisting of 45 grams (0.25 mole) of anhydrous glucose and 135 grams of the monomethyl ether of ethylene glycol. The glucose was hydrogenated to sorbitol under standard agitation conditions with a rate constant of 6.0.

*Example 2*

This example illustrates the use of a phosphoric acid activated Raney catalyst. Raney nickel of the commercial variety was washed repeatedly with the monomethyl ether of ethylene glycol. About 3 grams of this Raney nickel was then added to a mixture of 45 grams glucose, 135 grams of the monomethyl ether of ethylene glycol and 20 milligrams of phosphoric acid. When hydrogen was applied to this mixture at a pressure of 50 p.s.i.g. with a reaction temperature of 125° C. and standard agitation conditions, the rate constant was 26.1.

*Example 3*

This example illustrates the use of the various hydroxy ethers within the scope of the present invention as well as other materials and shows the superiority of the hydroxy ethers of this invention over other materials. In this example commercial Raney nickel was washed with the "solvent" which was to be used as the reaction medium and 3 grams of the washed catalyst was then added to a mixture of 45 grams of glucose, 20 mg. of phosphoric acid, and 135 grams of the reaction medium. This reaction mixture was then contacted with hydrogen at a pressure of 50 p.s.i.g., a temperature of 125° C., and under standard agitation. The following table illustrates the reaction medium employed and the rate constant obtained in the hydrogenation of the glucose with the various reaction media.

| Reaction medium: | Rate constant |
|---|---|
| Monomethyl ether of ethylene glycol | 26.1 |
| Monomethyl ether of diethylene glycol | 16.2 |
| Water | 3.0 |
| Ethylene glycol | 2.2 |

Example 4

This example illustrates the effect of the concentration of the hydroxy ether employed in the present invention on the reaction constant. Commercial Raney nickel was washed several times with the monomethyl ether of ethylene glycol, and 3 grams of the washed catalyst was added to a mixture of 20 mg. of phosphoric acid, and varying amounts of glucose and the monomethyl ether of ethylene glycol. These reaction mixtures were then subjected to a temperature of 125° C. and a hydrogen pressure of 50 p.s.i.g. under standard agitation. The table below lists the grams of monomethyl ether of ethylene glycol, the grams of glucose, the parts by weight of the hydroxy ether per part of glucose, and the rate constant observed in each case.

| Hydroxy Ether (grams) | Glucose (grams) | Parts Hydroxy Ether per part glucose | Rate Constant |
|---|---|---|---|
| 90 | 90 | 1 | 5.5 |
| 135 | 45 | 3 | 26.1 |
| 255 | 45 | 5.7 | 15.6 |

Example 5

This example illustrates the effect of temperature on the process of the present invention. In this example commercial Raney nickel was washed with the monomethyl ether of ethylene glycol, and 3 grams of the washed catalyst was then added to a mixture of 45 grams of glucose, 135 grams of the monomethyl ether of ethylene glycol, and 20 mg. of phosphoric acid. A number of reaction mixtures of this composition were subjected to a hydrogen pressure of 50 p.s.i.g. under standard agitation and varying temperatures. The following table illustrates the temperature at which the reaction was conducted and the rate constant observed.

Reaction temperature: Rate constant
110° C. _____ 9.6
115° C. _____ 14.0
125° C. _____ 26.1
140° C. _____ 27.4

Example 6

This example illustrates the effect of pressure on the process of the present invention. A number of reaction mixtures were made up by adding 3 grams of a commercial Raney nickel which had been washed in the monomethyl ether of ethylene glycol to a mixture of 45 grams of glucose, 135 grams of the monomethyl ether of ethylene glycol, and 20 mg. of phosphoric acid. The glucose in these reaction mixtures was hydrogenated to sorbitol at a temperature of 125° C. under standard agitation employing various hydrogen pressures. The table below lists the hydrogen pressures employed and the rate constants observed in these runs.

Hydrogen pressure (p.s.i.g.): Rate constant
5 _____ 4.5
10 _____ 5.2
20 _____ 10.2
30 _____ 11.1
40 _____ 14.4
50 _____ 14.6
60 _____ 16.9

Example 7

This example illustrates the use of Raney-type nickel catalysts containing chromium. A number of alloys were prepared containing 50 percent by weight of aluminum and varying percentages by weight of chromium with the remainder of each alloy consisting of nickel. These alloys were then ground to a powder and placed in an aqueous sodium hydroxide solution. After all but a minor amount of the aluminum had been removed from the catalyst by this method, about 3 grams of each catalyst was added to a mixture of 45 grams of glucose, 135 grams of monomethyl ether of ethylene glycol, and 20 mg. of phosphoric acid. The reaction mixtures were then brought to a temperature of 125° C. and subjected to a hydrogen pressure of 50 p.s.i.g. with standard agitation. The table below lists the amount of chromium in each alloy and the rate constant found in the hydrogenation of the glucose to sorbitol in each system.

Percent chromium: Rate constant
10 _____ Negligible
5 _____ 6.1
2 _____ 14.8
1 _____ 18.2
0.5 _____ 21.4
0.35 _____ 23.4
0.25 _____ 20.3
0.1 _____ 16.2

Example 8

This example illustrates the use of Raney-type nickel catalyst containing a third metallic component other than chromium. In this example, alloys were prepared containing 50 percent by weight of aluminum and varying percentages by weight of a single metal selected from the class of molybdenum, titanium, zirconium, manganese, vanadium or cerium, with the remainder of the alloy consisting of nickel. These various alloys were digested in aqueous sodium hydroxide to remove all but 5 or 10 percent of the aluminum. In each run, 3 grams of the alloy was added to a mixture of 45 grams of glucose and 135 grams of the monomethyl ether of ethylene glycol. This reaction mixture was then heated to a temperature of 125° C. and maintained under a hydrogen pressure of 50 p.s.i.g. with standard agitation. The table below lists the metallic component in the alloy in addition to the nickel and aluminum and the percentage of the additional metal. The table also lists the rate constants observed in the hydrogenation of the glucose to sorbitol in the particular systems.

| Third metal in Alloy | Percent of Third Metal in Alloy | Rate Constant |
|---|---|---|
| Mo | 5.0 | 14.1 |
| Mo | 2.5 | 24.0 |
| Mo | 1.0 | 16.8 |
| Mo | 0.5 | 15.4 |
| Mn | 1.0 | 12.4 |
| Mn | 0.25 | 17.9 |
| V | 1.0 | 11.3 |
| V | 0.25 | 14.7 |
| Ce | 1.0 | 13.0 |
| Ce | 0.25 | 18.7 |
| Ti | 1.0 | 18.6 |
| Ti | 0.25 | 18.9 |
| Zr | 2.0 | 19.1 |
| Zr | 1.0 | 10.0 |

Example 9

This example illustrates a Raney-type nickel catalyst in which a large percentage of the nickel is replaced by cobalt. An alloy was prepared of 50 percent by weight of aluminum, 30 percent nickel, and 20 percent cobalt. This alloy was ground to a fine powder and placed in an aqueous sodium hydroxide solution where all but about 5 percent by weight of the aluminum was removed. This catalyst was then washed with water to remove all of the alkali and then washed with monomethyl ether of ethylene glycol. Three grams of the resulting washed catalyst was added to a mixture of 45 grams of glucose, 135 grams of the monomethyl ether of ethylene glycol, and 20 mg. of phosphoric acid. This mixture was then heated to a temperature of 125° C. and subjected to a hydrogen pressure of 50 p.s.i.g. with standard agitation. The glucose was hydrogenated to sorbitol in this run and the rate constant was found to be 9.1.

Example 10

This example illustrates the process of the present invention using a Raney-type nickel catalyst which has been modified by the addition of copper. An alloy of 50 percent aluminum, 45 percent nickel and 5 percent by weight of copper was ground to a powder and digested in aqueous sodium hydroxide to remove all but a minor amount of the aluminum. The resulting catalyst was then washed with water to remove the alkali, subsequently washed with the monomethyl ether of ethylene glycol to remove the water and finally washed with 100 ml. of a monomethyl ether of ethylene glycol solution containing 0.1 percent by weight of phosphoric acid. About 3 grams of this catalyst was added to 45 grams of glucose and 135 grams of the monomethyl ether of ethylene glycol. The reaction mixture was heated to a temperature of 125° C. and hydrogen at a pressure of 50 p.s.i.g. was applied employing standard agitation. During the hydrogenation of the glucose to sorbitol the rate constant was found to be 12.9.

Example 11

This example illustrates the use of a copper-plated Raney-type nickel catalyst in the process of the present invention. About 3 grams of commercial Raney nickel was washed in 20 ml. of a 10 percent copper sulfate solution to cause copper to replace some of the nickel on the surface of the catalyst. This copper-plated catalyst was then washed with water to remove all of the sulfate salts and then washed with the monomethyl ether of ethylene glycol to remove the water. Three grams of this catalyst was then added to a mixture of 45 grams of glucose and 135 grams of monomethyl ether of ethylene glycol. This mixture was then heated to a temperature of 125° C. and hydrogen at a pressure of 50 p.s.i.g. was applied to the reaction mixture with standard agitation. This resulted in the hydrogenation of glucose to sorbitol with a rate constant of 19.6.

Example 12

This example illustrates the effect of phosphoric acid on commercial Raney nickel such as the nickel described in connection with the aforementioned Raney patent. A number of reaction mixtures were made up by adding 3 grams of a commercial Raney nickel which had been washed in a monomethyl ether of ethylene glycol to a mixture of 45 grams of glucose, and 135 grams of the monomethyl ether of ethylene glycol. Various amounts of phosphoric acid were added to these reaction mixtures as a solution prepared by adding 1 ml. of 85 percent phosphoric acid to 99 ml. of the monomethyl ether of ethylene glycol. The glucose in each of these reaction mixtures was then hydrogenated to sorbitol at a temperature of 125° C. and a hydrogen pressure of 50 p.s.i.g. under standard conditions of agitation. The table below lists the amount of phosphoric acid in each reaction mixture in milligrams and the rate constant observed in each run.

| $H_3PO_4$, milligrams: | Rate constant |
| --- | --- |
| 0 | 6.0 |
| 10 | 22.9 |
| 20 | 26.1 |
| 40 | 16.5 |
| 80 | 14.6 |

Example 13

This example illustrates the pretreatment of commercial Raney nickel with phosphoric acid. In this example a number of three gram samples of commercial Raney nickel were washed for three minutes in various amounts of 0.1 percent phosphoric acid, then washed with plain water, and finally washed with the monomethyl ether of ethylene glycol. Each of these catalysts and a catalyst which had not been treated with acid was added to a reaction mixture consisting of 45 grams of glucose, and 135 grams of the monomethyl ether of ethylene glycol. The glucose in these reaction mixtures was then hydrogenated to sorbitol at a temperature of 125° C., a hydrogen pressure of 50 p.s.i.g. and with standard conditions of agitation. The table below lists the number of milligrams of phosphoric acid present in the wash solution used to treat the catalyst and the rate constant observed in the hydrogenation.

| $H_3PO_4$, milligrams: | Rate constant |
| --- | --- |
| 0 | 6.0 |
| 20 | 22.4 |
| 40 | 21.2 |
| 80 | 27.9 |
| 100 | 21.3 |

Example 14

This example illustrates the effectiveness of sulfuric acid activated Raney-type nickel on the catalyst in the process of the present invention. A number of solutions of 45 grams of glucose in 135 grams of the monomethyl ether of ethylene glycol were made up. To the first of these solutions was added 3 grams of a commercial Raney nickel. To the second of these solutions was added 3 grams of a commercial Raney nickel and 10 mg. of sulfuric acid (as a 0.1 percent aqueous solution). To the remaining solutions were added a sulfuric acid activated Raney nickel which had been prepared by treating a commercial Raney nickel with various amounts of a 0.1 percent aqueous sulfuric acid solution with the subsequent washing of the catalyst in water and the monomethyl ether of ethylene glycol. The glucose in these reaction mixtures was then hydrogenated to sorbitol at a temperature of 125° C., at a hydrogen pressure of 50 p.s.i.g., and with standard agitation. The table below lists the amount of sulfuric acid employed in each of the hydrogenations, specifies whether the sulfuric acid was added to the reaction mixture or whether the catalyst was pretreated, and lists the rate constant observed in the hydrogenation.

| Sulfuric acid (milligrams): | Rate constant |
| --- | --- |
| 0 | 6.0 |
| 10 (in reaction mixture) | 8.5 |
| 10 (pretreated) | 8.5 |
| 20 (pretreated) | 16.5 |
| 40 (pretreated) | 13.8 |

Example 15

The ethyl ester of acetoacetic acid was hydrogenated to the ethyl ester of β-hydroxybutyric acid by adding 3 grams of a catalyst which had been prepared from an alloy containing 50 percent aluminum, 0.35 percent chromium, and 49.65 percent nickel and thereafter leaching the alloy with aqueous sodium hydroxide. About 3 grams of this catalyst was added to a mixture of 51.3 grams of the ethyl ester of acetoacetic acid, 135 grams of the methyl ether of ethylene glycol, and 20 mg. of phosphoric acid. This reaction mixture was heated to a temperature of 115° C. and subjected to hydrogen at a pressure of about 50 p.s.i.g. under standard conditions of agitation. The rate constant observed in this run was 18.5.

Example 16

About 3 grams of the catalyst described in the preceding example was added to a mixture of 45 grams of D(−) levulose and 135 grams of the methyl ether of ethylene glycol and the mixture was heated to a temperature of 125° C. When hydrogen at a pressure of 50 p.s.i.g. was applied to this reaction mixture with standard agitation, the levulose was converted to mannitol and the rate constant observed during the reaction was 15.9.

Example 17

About 3 grams of the catalyst of Example 15 was added to a mixture of 45 grams of acetone and 135 grams of methyl Cellosolve. This reaction mixture was brought to a temperature of about 50° C. while it was subjected to hydrogen at a pressure of about 50 p.s.i.g. under standard agitation. This hydrogenation resulted in the formation of isopropyl alcohol with a rate constant of about 8.50. This same procedure was repeated except that the methyl ether of ethylene glycol was replaced by 135 grams of water. In this case the rate constant for the conversion of the acetone to isopropyl alcohol was less than 1.0.

*Example 18*

About 3 grams of the catalyst of Example 15 was added to a mixture of 28.6 grams of heptaldehyde and 135 grams of the monomethyl ether of ethylene glycol. This reaction mixture was heated to a temperature of about 75° C. and hydrogen at an initial pressure of about 50 p.s.i.g. was admitted under standard agitation to the reaction vessel to convert the aldehyde to heptanol-1. The rate constant observed in this run was 9.4.

*Example 19*

About 3 grams of the catalyst of Example 15 was added to a mixture of 45 grams of benzaldehyde and 135 grams of the monomethyl ether of ethylene glycol. This reaction mixture was heated to a temperature of about 75° C. and subjected to hydrogen at a pressure of about 50 p.s.i.g. under standard agitation. The benzaldehyde was converted to benzyl alcohol with a rate constant of about 27.6.

*Example 20*

About 3 grams of the catalyst of Example 15 was added to a mixture of 18.75 grams of xylose and 135 grams of the monomethyl ether of ethylene glycol. This reaction mixture was heated to a temperature of about 125° C. and subjected to hydrogen at a pressure of about 50 p.s.i.g. under standard agitation. The xylose was converted to xylitol with a rate of constant of about 33.1.

*Example 21*

Sucrose was hydrolyzed to a mixture of glucose and levulose by refluxing 42.79 grams of sucrose, 135 grams of the monomethyl ether of ethylene glycol, 2.25 grams water and 50 milligrams of phosphoric acid for 2 hours. About 3 grams of the catalyst of Example 15 was then added to the reaction mixture and this mixture was maintained at a temperature of about 125° C. under a pressure of about 50 p.s.i.g. of hydrogen with standard agitation. The glucose and levulose resulting from the hydrolysis were converted to sorbitol and mannitol with a rate constant of about 12.9.

*Example 22*

About 3 grams of the catalyst of Example 15 was added to a mixture of 49.5 grams of glucose monohydrate and 135 grams of the monomethyl ether of ethylene glycol. This reaction mixture was heated to a temperature of about 125° C. and subjected to hydrogen at a pressure of about 50 p.s.i.g. under standard agitation. The glucose monohydrate was converted to sorbitol with a rate constant of about 17.9.

*Example 23*

A chromium modified Raney-type nickel catalyst was prepared from an alloy containing 50 percent by weight of aluminum, 0.42 percent chromium, and 49.58 percent nickel. This alloy was treated with an aqueous sodium hydroxide solution to remove all but a minor amount of the aluminum. The resulting catalyst was then washed with water to remove the alkali and with the monomethyl ether of ethylene glycol to remove the water. About 3 grams of this catalyst was then dissolved in a mixture of 114 grams of acetonyl acetone and 145 grams of the monomethyl ether of ethylene glycol. This reaction mixture was heated to a temperature of about 110° C. and hydrogen at a pressure of about 50 p.s.i.g. was introduced to the reaction vessel under standard conditions of agitation. This hydrogenation resulted in the formation of 2,5-dihydroxyhexane with the rate constant being about 17.0.

*Example 24*

About 3 grams of the catalyst described in the preceding example was added to a mixture of 48 grams of furfural and 115 grams of the monomethyl ether of ethylene glycol. This reaction mixture was heated to a temperature of about 90° C. and subjected to hydrogen at a pressure of about 50 p.s.i.g. with standard agitation. This resulted in the conversion of the furfural to tetrahydrofurfuryl alcohol with a rate constant of about 2.1.

Although the foregoing examples have described the process of the present invention primarily in terms of relatively low hydrogen pressures, i.e., pressures up to about 50 p.s.i.g., it should be understood that the process of the present invention may be carried out at higher pressures. However, I prefer to carry out the reaction in the range described so as to minimize the need for expensive high pressure equipment and to minimize the hazard to operating personnel incident to the use of high pressure equipment. Although the examples have described the hydrogenation of a large number of carbonyl-containing organic compounds, it should be obvious that carbonyl-containing organic compounds other than those described in the examples may be hydrogenated equally as well. In the hydrogenation of carbonyl-containing compounds other than those specifically pointed out in the examples, the advantages of the low pressure hydrogenation of the present invention can also be realized.

What I claim as new and desire to secure by Letters Patent of the United States is:

1. The method of reducing the carbonyl group of a carbonyl-containing organic compound to the corresponding carbinol group, the said carbonyl-containing organic compound being selected from the class consisting of organic ketones and organic aldehydes, which method comprises contacting under substantially anhydrous conditions and at a pressure of at most 150 p.s.i. with hydrogen a mixture of said organic compound, a Raney-type nickel hydrogenation catalyst and a solvent having the formula

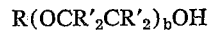

$$R(OCR'_2CR'_2)_bOH$$

where R is an alkyl radical of from 1 to 4 carbon atoms, R' is a member selected from the class consisting of hydrogen and alkyl radicals of from 1 to 2 carbon atoms, and $b$ is an integer from 1 to 3, inclusive.

2. The method of claim 1 in which the solvent is the monomethyl ether of ethylene glycol.

3. The method of claim 1 in which the solvent is the monomethyl ether of diethylene glycol.

4. The method of claim 1 in which the carbonyl-containing organic compound is glucose.

5. The method of claim 1 in which the carbonyl-containing organic compound is furfural.

6. The method of claim 1 in which the carbonyl-containing organic compound is a monosaccharide.

7. The method of claim 1 in which the carbonyl-containing compound is a ketone.

8. The method of claim 1 in which the carbonyl-containing organic compound is an aldehyde.

9. The method of claim 1 in which the Raney-type nickel catalyst contains a minor amount of chromium.

10. The method of converting glucose to sorbitol which comprises contacting under substantially anhydrous conditions and at a pressure of at most 150 p.s.i. with hydrogen a mixture of glucose and the monomethyl ether of ethylene glycol in the presence of a Raney-type nickel catalyst.

11. The method of hydrogenating glucose to sorbitol which comprises contacting under substantially anhydrous conditions and at a pressure of at most 150 p.s.i. a mixture of glucose and the monomethyl ether of diethylene glycol with hydrogen in the presence of a Raney-type nickel catalyst.

12. The method of hydrogenating glucose monohydrate to sorbitol which comprises contacting under substantially anhydrous conditions and at a pressure of at most 150 p.s.i. a mixture of glucose monohydrate with the monomethyl ether of ethylene glycol with hydrogen in the presence of a Raney-type nickel catalyst.

13. The method of reducing the carbonyl group of a carbonyl-containing organic compound to the corresponding carbinol group, the said carbonyl-containing organic compound being selected from the class consisting of organic ketones and organic aldehydes, which method comprises contacting under substantially anhydrous conditions and at a pressure of at most 150 p.s.i. with hydrogen a mixture of said organic compound, a Raney-type nickel catalyst, an acid selected from the class consisting of phosphoric acid and sulfuric acid, and a solvent having the formula $$R(OCR'_2CR'_2)_bOH$$

where R is an alkyl radical having from 1 to 4 carbon atoms, R' is a member selected from the class consisting of hydrogen and alkyl radicals having from 1 to 2 carbon atoms, and $b$ is an integer equal to from 1 to 3, inclusive.

14. The method of claim 13 in which the acid is phosphoric acid.

15. The method of reducing the carbonyl group of a carbonyl-containing organic compound to the corresponding carbinol group, the said carbonyl-containing organic compound being selected from the class consisting of organic ketones and organic aldehydes, which method comprises contacting under substantially anhydrous conditions and at a pressure of at most 150 p.s.i. with hydrogen a mixture of said organic compound, an activated Raney-type nickel hydrogenation catalyst, and a solvent having the formula $$R(OCR'_2CR'_2)_bOH$$

where R is an alkyl radical of from 1 to 4 carbon atoms, R' is a member selected from the class consisting of hydrogen and alkyl radicals having from 1 to 2 carbon atoms, and $b$ is an integer from 1 to 3, inclusive, said catalyst having been activated by contacting said catalyst with a member selected from the class consisting of phosphoric acid and sulfuric acid.

16. The method of claim 1 in which the Raney-type nickel catalyst contains a minor amount of a metal selected from the class consisting of chromium, molybdenum, titanium, zirconium, vanadium, cerium, and manganese.

17. The method of claim 1 in which the Raney-type nickel catalyst is copper plated.

18. The method of claim 1 in which the Raney-type nickel catalyst is activated with an acid selected from the class consisting of sulfuric acid and phosphoric acid.

19. The method of reducing the carbonyl group of a carbonyl-containing organic compound selected from the class consisting of aliphatic aldehydes, furfural, aliphatic ketones, benzaldehyde, monosaccharides, polysaccharides, and hydrates of carbohydrates, to the corresponding carbinol derivative, which method comprises contacting under substantially anhydrous conditions and at a pressure of at most 150 p.s.i. with hydrogen, a mixture of said carbonyl-containing organic compound, a Raney nickel hydrogenation catalyst and a solvent capable of increasing the rate constant of said hydrogenation reaction, having the formula $$R(OCR'_2CR'_2)_bOH$$

where R is an alkyl radical of from 1 to 4 carbon atoms, R' is a member selected from the class consisting of hydrogen and alkyl radicals of from 1 to 2 carbon atoms and $b$ is an integer from 1 to 3, inclusive.

References Cited in the file of this patent
UNITED STATES PATENTS

| | | |
|---|---|---|
| 1,794,453 | Graves | Mar. 3, 1931 |
| 1,906,873 | Peters | May 2, 1933 |
| 1,913,938 | Metzger | June 13, 1933 |
| 2,088,633 | Bousquet | Aug. 3, 1937 |
| 2,114,696 | Austin | Apr. 19, 1938 |
| 2,278,549 | Loder | Apr. 7, 1942 |
| 2,280,975 | Power | Apr. 28, 1942 |
| 2,289,784 | Houghton | July 14, 1942 |
| 2,364,970 | Gwynn | Dec. 12, 1944 |
| 2,501,708 | Bewley | Mar. 28, 1950 |
| 2,609,398 | Lolkema | Sept. 2, 1952 |
| 2,691,047 | Hagemeyer | Oct. 5, 1954 |
| 2,694,077 | Stansbury | Nov. 9, 1954 |
| 2,749,371 | Kasehagen | June 5, 1956 |
| 2,768,979 | Hambrock et al. | Oct. 30, 1956 |

FOREIGN PATENTS

| | | |
|---|---|---|
| 630,161 | Great Britain | Oct. 6, 1949 |

OTHER REFERENCES

Ellis: "Hydrogenation of Organic Substances," page 60, 1930, Van Nostrand Co.

Dunlap et al.: "The Furans," A.C.S., Monograph #119, 1953, pages 693–700.